United States Patent [19]
Knapp

[11] Patent Number: 5,195,555
[45] Date of Patent: Mar. 23, 1993

[54] CARTRIDGE FOR MIXER VALVE HAVING AN INTERNAL BOTTOM WITH HYDRAULIC EFFECT

[76] Inventor: Francesco Knapp, Via Brigata Pavia 10, I-27100 Pavia, Italy

[21] Appl. No.: 788,472

[22] Filed: Nov. 6, 1991

[30] Foreign Application Priority Data

Nov. 16, 1990 [IT] Italy .................. 67894 A/90

[51] Int. Cl.$^5$ .................. F16K 11/06; F16K 25/00
[52] U.S. Cl. .................. 137/454.6; 137/454.2; 137/625.17; 137/625.4; 251/172; 251/174
[58] Field of Search .......... 137/625.17, 625.4, 625.41, 137/454.2, 454.5, 454.6; 251/172, 174

[56] References Cited

U.S. PATENT DOCUMENTS

| | | | |
|---|---|---|---|
| 3,938,546 | 2/1976 | Farrell | 137/454.2 |
| 4,478,249 | 10/1984 | Fleischmann | 137/454.6 X |
| 4,610,268 | 9/1986 | Knapp | 137/454.6 |
| 4,733,694 | 3/1988 | Knapp | 137/625.17 |
| 4,838,304 | 6/1989 | Knapp | 137/454.6 |
| 4,942,902 | 7/1990 | Knapp | 137/454.6 X |

FOREIGN PATENT DOCUMENTS

8707068 10/1988 Fed. Rep. of Germany.

Primary Examiner—John Rivell
Attorney, Agent, or Firm—Young & Thompson

[57] ABSTRACT

A cartridge intended to be inserted into a body chamber of a mixer valve, which comprises a cage, a fixed plate of hard material, a movable plate of hard material operatively displaceable in the cage and contacting the fixed plate, the plates having mutually cooperating conformations for controlling the flow rate delivered by the valve and the mixing ratio between hot and cold water, and an operator for effecting the displacement of the movable plate in order to execute these controls. The cartridge cage comprises an operatively fixed bottom which is provided at the outside with seals intended to operate between the cartridge fixed bottom and the bottom of the valve body chamber as a consequence of the tightening of the cartridge, and is provided at the inside with couplings complementary to couplings operatively solid with the fixed plate of the cartridge. The fixed plate is mounted within the cartridge cage with a possibility of displacement along a direction perpendicular to its surface contacting the movable plate, and there are provided members with hydraulic effect for applying to the fixed plate a contact pressure against the movable plate.

9 Claims, 2 Drawing Sheets

CARTRIDGE FOR MIXER VALVE HAVING AN INTERNAL BOTTOM WITH HYDRAULIC EFFECT

DESCRIPTION

The subject of the present invention is a cartridge intended to be inserted into a body chamber of a hydraulic mixer valve for hot and cold water, this cartridge comprising a cage, seal means on the cage for acting against the bottom of the valve body chamber, a fixed plate of hard material mounted in operatively fixed position in the cage, at least one movable plate of hard material mounted in operatively controllable position in the cage and contacting said fixed plate, said plates having mutually cooperating conformations intended to control the flow rate delivered by the valve and the mixing ratio between hot and cold water, and operating means intended to effect the displacement of said movable plate for allowing executing the controls.

In the usual forms, such cartriuges are tightened in the valve body chamber by means of a ring forming a body cover or by means of screws, and the seal means intended to act against the bottom of the valve body chamber are tightened between said bottom and the fixed plate, whereby the pressure which tightens the cartridge also serves to compress the sealing means as well as to apply an identical pressure between the fixed and movable plates of the cartridge. However, in most circumstances the pressure needed for a correct operation of the seal means is greater that the pressure needed between the fixed and movable plates, whereby this latter appears to be too great, hinders with no advantage the valve operation and increases the wear thereof. Moreover, the thermic expansion further increase such pressure, enhancing the drawbacks and also leading to a possible jamming of the valve.

In some improved cartridges, the socalled cartridges with hydraulic effect, which are known for example from the U.S. Pat. No. 4,733,694, said drawback is obviated by providing the cartridge cage with projecting connections which engage by means of radial seal means in corresponding hollows of the bottom of the valve body chamber, and by mounting the cartridge within the valve body chamber with a certain possibility of axial displacement. Thus the pressure acting onto the radial seal means of the connections depends only on the design of the parts, and it does not affect the pressure applied between the cartridge plates, whereby this latter pressure may be fixed at an optimal value by the action of the hydraulic pressure applied to the valve, as well as, if needed, by elastic pre-loading means. According to the German Utility Model No. 87 07 068, a partially similar behaviour is obtained by providing the fixed plate itself with projecting connections intended to engage by radial seal means in corresponding hollows of the bottom of the valve body chamber.

However other drawbacks may take place in the use of such cartridges with hydraulic effect. Indeed, the projecting connections intended to engage in the corresponding hollows of the bottom of the valve body chamber have a noticeable size which imposes some limits to the distance and the angular position of the outlets of the passages provided in the valve body for supplying hot and cold water and, in certain cases, for removing the delivered mixed water. This leads in certain cases to design difficulties, which usually are not met in using the conventional cartridges. The difficulties due to the greater distance needed between the seal means are even greater when use is made of the socalled "delex", which are sleeve connections of elastomeric material provided with elastic biasing means. Especially, great difficulties or even the impossibility is met, when an attempt is made for using cartridges with hydraulic effect in replacement of the usual cartridges in the existing mixer valves. Moreover, the need for realizing a precise engagement of the projecting connections in the hollows of the bottom of the valve body chamber requires for these hollows a machining precision which is difficult to obtain in the industrial production of such hollows subject to machining, and in any event the precision of the engagement may thereafter be jeopardized by those thermic expansions which develop in the radial direction. Finally, the fact that the cartridge should be allowed a possibility of axial displacement, and hence that the cartridge cannot be tightened within the valve body chamber, gives the possibility that the cartridge may also displace in oscillation due to the unavoidable clearances, and this may lead to drawbacks and, in any event, gives the user a undesirable sense of instability of the valve. Moreover, mounting the cartridge without tightening the same is particularly difficult in those kinds of valves in which the ring which closes the body has no shoulder capable of limiting the screwing thereof, as well as in those kinds of valves in which the cartridge should be fixed by means of screws.

In view of the above, the object of this invention is to realize a cartridge of the type specified in the preamble, which shows both the advantages of the conventional cartridges and of the cartridges having a hydraulic effect, namely, which is intended to be tightened in the valve body chamber by establishing an effective seal against the bottom of this chamber and remaining kept therein in a stable position, which does not impose particular limits to the position of the outlets of the passages provided in the valve body, but on the contrary may be adapted to their disposition, which does not pose particular problems for the machining precision, and which, despite all this, has a hydraulic effect such as to allow chosing at an optimal value the pressure applied between the cartridge plates, irrespective of the pressure applied to the seal means acting against the bottom of the valve body chamber.

This object is attained, according to this invention, in that the cartridge cage comprises an operatively fixed bottom which is provided at the outside with seal means intended to operate between the cartridge fixed bottom and the bottom of the valve body chamber as a consequence of the tightening of the cartridge within said chamber, and is provided at the inside with coupling means co-operating with complementary coupling means operatively solid with the fixed plate of the cartridge; that the fixed plate is mounted within the cartridge cage with a possibility of displacement along a direction perpendicular to its surface contacting the movable plate; and that means are provided for applying to the fixed plate a contact pressure against the movable plate, such means being of a type capable of realizing, at least in part, a hydraulic effect.

Thanks to this arrangement, the cartridge behaves, towards the exterior, as a conventional cartridge; it may be tightened within the valve body chamber in the conventional manner and remains positively clamped therein, but its seal means, which are compressed against the bottom of the valve body chamber, apply a pressure to the operatively fixed bottom of the cartridge, without affecting the fixed plate thereof. This latter, on its turn, is biased against the movable plate by the pressure means provided to this purpose, irrespective of the pressure which tightens the cartridge within the valve body chamber, by realizing at least in part a hydraulic effect. The connections between the cartridge bottom and the bottom of the valve body chamber are embodied in the conventional manner and they do not pose any disposition and design problem; the cartridge body itself may be easily provided with passages capable of communicating the connections, which are arranged in order to co-operate with the passages which open in the bottom of the valve body chamber, with the inner means coupling with the fixed plate of the cartridge, when the arrangements of said connections and coupling means do not correspond. Even in the case in which the coupling means between the cartridge bottom and the fixed plate are chosen of a type which needs a precise coupling, this need may be fulfilled in manufacturing the cartridge parts, usually molded of plastics, more easily than by mechanically machining hollows in the bottom of the valve body chamber, and they are not subsequently jeopardized by the thermic expansions.

The means for applying a pressure to the fixed plate of the cartridge, capable of realizing, at least in part, a hydraulic effect, may be assisted by elastic pressure means.

In certain embodiments, a supporting member for the fixed plate is provided within the cartridge cage, it has said coupling means complementary to the internal coupling means of the bottom of the cartridge cage, and has seal means acting against the fixed plate. Preferably, in this case, there is further provided a means for fixing the fixed plate to the supporting member, said means being capable of sustaining the pressure of the seal means inserted between the fixed plate and the supporting member.

In other embodiments, however, the coupling means complementary to the internal coupling means of the bottom of the cartridge cage are provided directly on the fixed plate of the cartridge. In this case, no supporting member is required for the fixed plate.

The coupling means provided inside the bottom of the cartridge cage and those operatively solid with the fixed plate may be embodied by projecting connections engaging complementary hollows with radial seal means, or even they may be embodied by sleeves of elastomeric material having elastic biasing means, which may operate against complementary coupling means simply formed by substantially plane surfaces in which the passages for the water open.

These and other features and advantages of the invention will appear more clearly from the following description of some embodiments, referred to as non-limitative examples and diagrammatically shown in the appended drawings, wherein.

Figure 1:
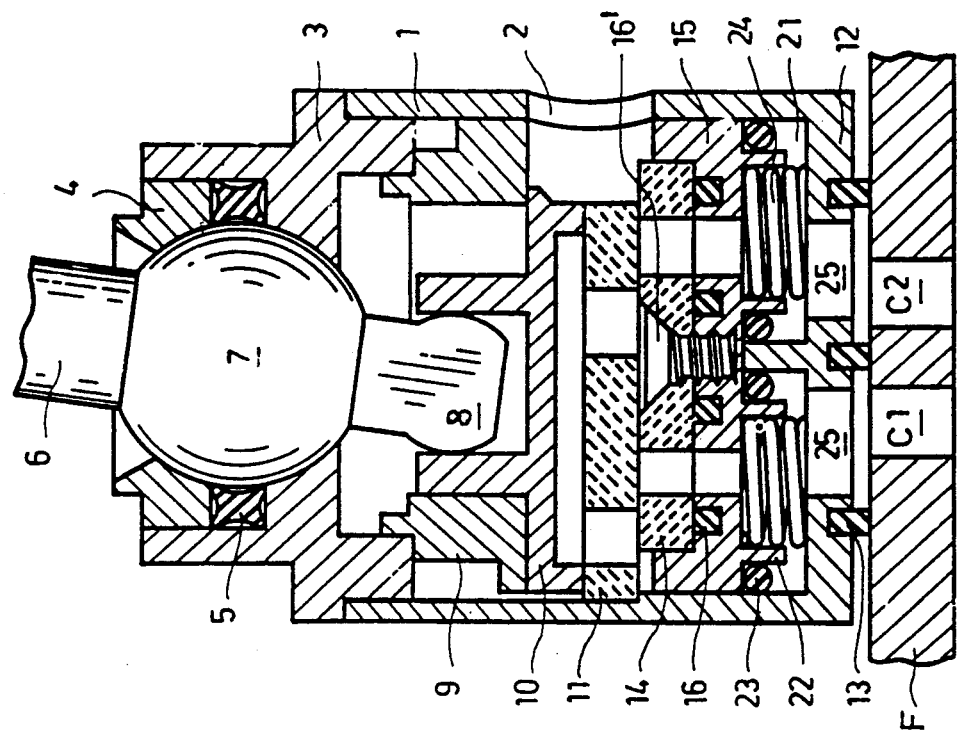
FIG. 1 shows in an axial section and on an enlarged scale a first embodiment of a cartridge for mixer valve according to the invention, and also shows the bottom of the valve body chamber on which the cartridge rests.

With reference to FIG. 1, a cartridge for a mixer valve includes a cage 1, which in the shown embodiments has an opening 2 for delivering the mixed water, and a cover 3 which forms a half bearing for an articulation ball 7 of a lever operating member 6, provided at the inner end with a transmission key 8. A ring 4, fixed to the cover 3 with the interposition of a packing 5, completes the bearing for the articulation ball 7. Below the cover 3 is mounted a guide ring 9 wherein runs a slide 10 mechanically coupled with the key 8. Slide 10 carries a movable plate 11 of hard material having suitable conformations, which in this case are in the form of through passages, for controlling, in co-operation with a fixed plate, the delivery rate and the mixing ratio of the valve.

The parts described until now are of a known type, and also well known is the manner of operating of such a mechanism, which under control of lever 6 allows displacing radially and rotationally the movable plate 11 in order to accomplish the valve control. However it is to be stated that the invention, although described, for the sake of easier comprehension, with reference to a specific embodiment of this mechanism, could find similar application in cartridges using any other type of mechanism for displacing one or more movable plates.

The cartridge cage 1 has an operatively fixed bottom 12. In the shown embodiment this bottom is solid with cage 1, but of course it could be constructively separate from the cage 1 and applied thereto. The bottom 12 carries at the outside one or more packings 13 intended to rest against the bottom F of the valve body chamber in which the cartridge should be mounted. In said bottom F there are provided two passages C1, C2 for inlet of cold and hot water, as well as, in the case of other embodiments, a third passage for removing the mixed water.

In the conventional cartridges the packings intended to rest against the bottom of the valve body chamber project internally from the cartridge bottom in order to also rest against the fixed plate mounted therein; on the contrary, packings 13 are positively seated in the bottom 12 and operate only between this latter and the bottom F of the valve body chamber. Therefore, their compression, which takes place when the cartridge is tightened in any known manner in the chamber of the valve body, does in no way affect the behaviour of the fixed plate of the cartridge.

In the embodiment now described, the fixed plate 14 is seated in a supporting member 15 mounted, axially displaceable, within the cage 1, and said plate is fixed to this supporting member by means of a screw 16' and with the interposition of sealing gaskets 16. The supporting member 15 has cylindrical seats 17 wherein engage, sealing by means of radial gaskets 20, the connections 18 which project towards the cartridge interior from bottom 12. The connections 18 form the coupling means of bottom 12, and the cylindrical seats 17 form the complementary coupling means operatively solid with the fixed plate 14.

The manner of operating of this device is as follows. When, through the passages C1 and C2, a hydraulic pressure reaches the valve body chamber over its bottom F, and arrives to the connections 18, it operates within the cylindrical seats 17 by repelling the supporting member 15. Therefore, this latter pushes the fixed plate 14 against the movable plate 11 with a force which depends on the value of the hydraulic pressure applied and on the cross section of the cylindrical seats 17. By dimensioning said cross section one may obtain that the pressure by which the fixed plate is pressed against the movable plate 11 is the more suitable one in all operating conditions. In this example, the contact pressure between the cartridge plates is due only to the hydraulic pressure.

As it may be understood, the cartridge, tightened in the valve body chamber in the conventional way with the entire force needed for effectively compressing the packings 13, operates an effective seal and cannot displace. The connections 18 should, in general, comply with some geometrical conditions, but they do not affect the position of the outlets of passages C1 and C2: if needed, an adaptation among the different positions may be easily performed by suitable conformations of the bottom 12, as for example the slanting corners 19 according to FIG. 1. Therefore the cartridge may be inserted either in a valve designed in the conventional way, or even, to replace the original cartridge, in a valve which was formerly provided with a cartridge not having hydraulic effect. The precise registry between the connections 18 and the cylindrical seats 17 may be attained in the manufacture (for example by molding of plastics) of the cage 1 or the cartridge bottom 12 and the supporting member 15, in a manner well easier than in machining the seats hollowed in the bottom of a valve body chamber, and subsequently it is not affected by differential thermic expansions.

In the embodiments shown in FIGS. 2 to 6, the same reference numbers are used for designating parts identical or generally corresponding to the parts described so far.

Figure 2:
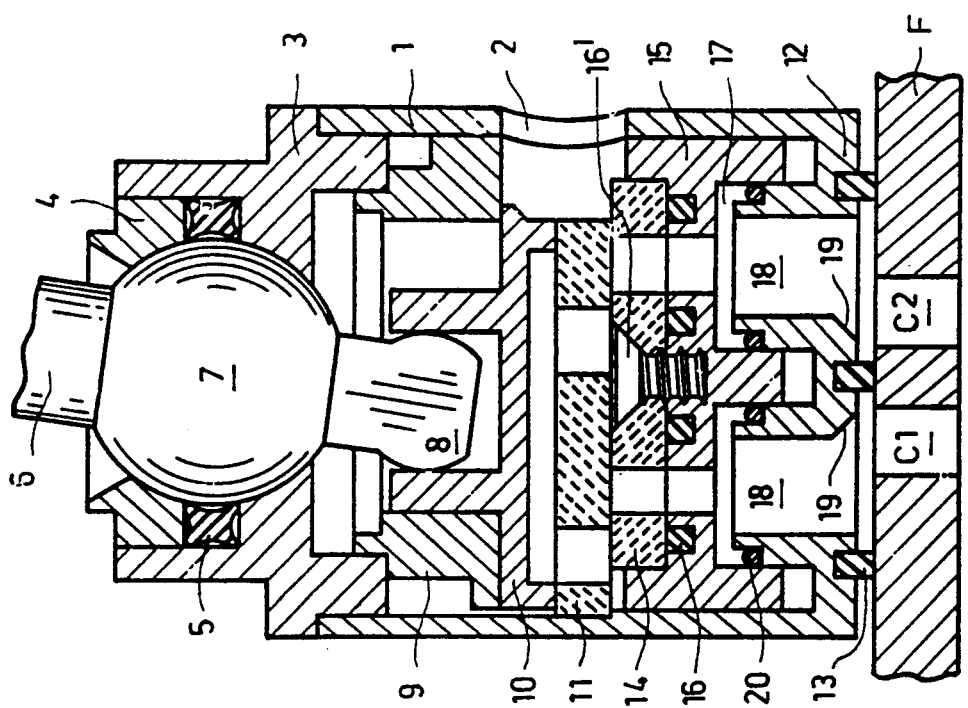
FIG. 2 shows in a manner similar to FIG. 1 a second embodiment of a cartridge for mixer valve according to the invention, and also shows the bottom of the valve body chamber on which the cartridge rests.

With reference to FIG. 2, it is noted that in this embodiment the cartridge bottom 12 has at the inside some cylindrical seats 21 which form coupling means, whereas the supporting member 5 has complementary coupling means in the form of projecting connections 22 which engage the cylindrical seats 21 and seal therein by means of radial gaskets 23. In this case, the presence of the cylindrical seats 21 allows easy realization of the openings 25 intended to communicate with the inlet passages C1 and C2, in suitable positions of the cartridge bottom 12. Moreover, in this embodiment there are provided springs 24 operating between the cartridge bottom 12 and the supporting member 15, in order to apply to the fixed plate 14 a certain preloading force, irrespective of the hydraulic pressure, which may be suitable particularly for the operation under low pressure. Apart from this latter detail, the manner of operating of the cartridge according to FIG. 2 is identical to that described with reference to the former embodiment.

Figure 3:
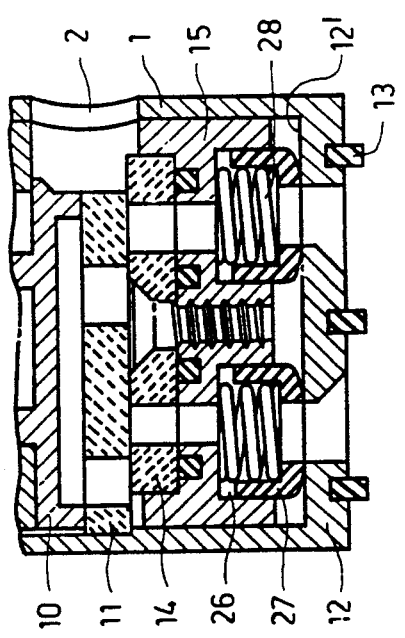
FIGS. 3 to 6 show on a somewhat reduced scale the lower part only of four cartridges according to other embodiments of the invention.
Figure 4:
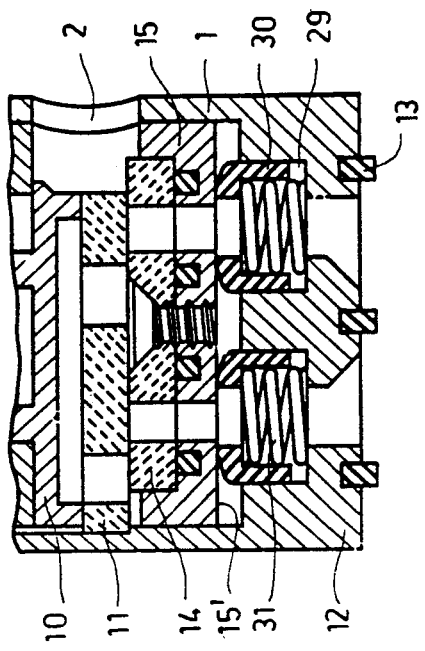

FIGS. 3 and 4 show two embodiments in which the hydraulic connections between the cartridge bottom and the supporting member for the fixed plate are formed by sleeves of elastomeric material, biased by springs. The main advantage in the use of such connections is that they may even co-operate with simple plane surfaces, and therefore they do not pose any requirement for respecting position tolerances, for the water passages.

According to FIG. 3, the supporting member 15 is provided with cylindrical seats 26 wherein are sealingly inserted the sleeves 27 of elastomeric material (socalled delex) provided with springs 28. In this case, the coupling means shown at the inside by the cartridge bottom 12 may also be a simple plane surface on which rest the outer ends of the sleeves 27 of elastomeric material.

According to FIG. 4, on the contrary, the cartridge bottom 12 is provided with two cylindrical seats 29 wherein are sealingly inserted the sleeves 30 of elastomeric material, provided with springs 31. In this case, the supporting member 15 may show, as complementary coupling means, a simple plane surface on which rest the outer ends of the sleeves 30 of elastomeric material.

In the embodiments according to FIGS. 3 and 4, the springs 28 or 31 which ensure the front seal of the connection sleeves of elastomeric material also apply a preloading force to the fixed plate 14, in addition to the force applied by the hydraulic pressure which acts in the seats wherein the sleeves of elastomeric material are inserted.

Figure 5:
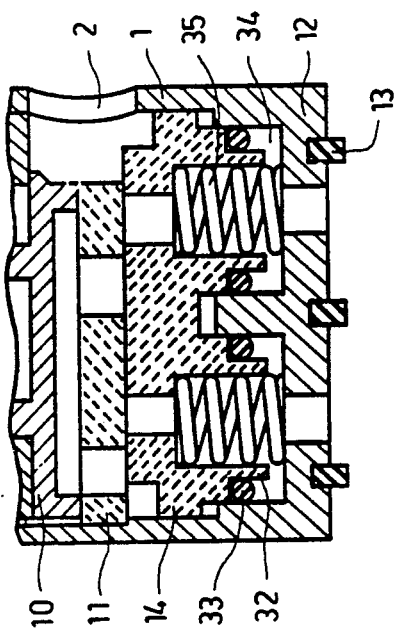
Figure 6:
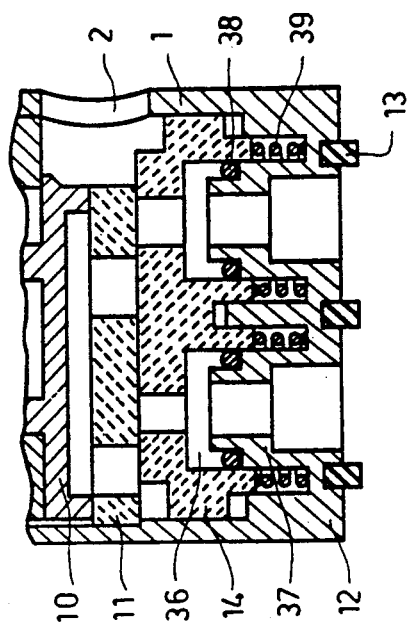

Finally, FIGS. 5 and 6 show two embodiments in which there is no supporting member for the fixed plate 14, which is provided by itself with solid coupling means which co-operate with the coupling means provided at the inside of the cartridge bottom 12.

According to FIG. 5, from the surface of fixed plate 14 which faces the cartridge bottom 12 project connections 32 which engage, sealing by means of radial gaskets 33, in cylindrical seats 34 formed in the cartridge bottom 12. If needed, the springs 35 may be inserted between the cartridge bottom 12 and the fixed plate 14.

On the contrary, according to FIG. 6 the fixed plate 14 has two cylindrical seats 36, and the cartridge bottom 12 has at the inside the projecting connections 37 which engage in the cylindrical seats 36, sealing by means of radial gaskets 38. In this case too, the springs 39 may be inserted, if needed, between the cartridge bottom 12 and the fixed plate 14, or even between this latter and the connections 37.

The cylindrical seats 36 of the fixed plate 14 may also be used for seating a sleeve of elastomeric material identical to that 27 of FIG. 3, also provided with a biasing spring, and in this case the complementary coupling means of the cage bottom 12 may have the form of a simple plane surface such as that 12' of FIG. 3.

In the embodiments according to FIGS. 5 and 6 it is attained the advantage of avoiding the addition of a supporting member 15 for the fixed plate 14, as well as of the packings 16 and the connection means 17. To this, of course, opposes a more complicate conformation of the fixed plate 14. The choice among the different possible embodiments should be done for each case by considering the particular requirements of each application.

In any event, the supporting member 15 when it exists, or the fixed plate 14 itself, when there is no supporting member, forms an internal bottom of the cartridge, having a hydraulic effect.

It is to be understood that the different modifications described and others, and any replacement by technically equivalent means, may be brought to what has been described and shown without departing from the spirit of the invention.

I claim:

1. In a cartridge intended to be inserted into a body chamber of a hydraulic mixer valve for hot and cold water, said chamber having a bottom, said cartridge comprising a cage, seal means for acting against said bottom of the valve body chamber, a fixed plate of hard material mounted in operatively fixed position in said cage, at least one movable plate of hard material mounted in operatively controllable position in said cage and contacting a surface of said fixed plate, said fixed and movable plates having mutually cooperating controllable position in said cage and contacting a surface of said fixed plate, said fixed and movable plates having mutually cooperating conformations intended to control the flow rate delivered by the valve and the mixing ratio between hot and cold water, and operating means intended to effect the displacement of said movable plate for executing the controls, the improvement that said cartridge cage comprises an operatively fixed bottom having at the outside seal means that seal between said cartridge fixed bottom and said bottom of the valve body chamber as a consequence of the tightening of the cartridge within said chamber, said fixed bottom having at the inside coupling means, and the cartridge including coupling means operatively solid with said fixed plate of the cartridge, complementary to said coupling means of the fixed bottom and co-operating therewith; that said fixed plate is mounted within said cartridge cage with a possibility of displacement along a direction perpendicular to its surface contacting said movable plate; and that the cartridge comprises pressure means for applying to the fixed plate a contact pressure against the movable plate, said pressure means operating at least in part under hydraulic pressure of water in said coupling means.

2. A valve cartridge as set forth in claim 1, further comprising elastic pressure means arranged for assisting said means capable of realizing, at least in part, a hydraulic effect.

3. A valve cartridge as set forth in claim 1, further comprising a supporting member for the fixed plate which is slidingly mounted within said cartridge cage, said supporting member having said coupling means complementary to said internal coupling means of the bottom of the cartridge cage, and having seal means acting against the fixed plate.

4. A valve cartridge as set forth in claim 3, further comprising a fixing means for fixing said fixed plate to said supporting member, said fixing means being capable of sustaining the pressure of said seal means inserted between the fixed plate and the supporting member.

5. A valve cartridge as set forth in claim 1, wherein said coupling means complementary to said internal coupling means of the bottom of the cartridge cage are provided directly on said fixed plate of the cartridge.

6. A valve cartridge as set forth in claim 1, wherein said coupling means provided inside said bottom of the cartridge cage and said coupling means operatively solid with said fixed plate comprise projecting connections and complementary cylindrical seats, and said projections have seal means provided for acting in radial direction between the outer surfaces of said projecting connections and the inner surfaces of said cylindrical seats.

7. A valve cartridge as set forth in claim 1, wherein said coupling means provided inside said bottom of the cartridge cage and said coupling means operatively solid with said fixed plate comprise sleeves of elastomeric material and elastic biasing means, provided for operating against said complementary coupling means which are in the form of substantially plane surfaces.

8. A valve cartridge as set forth in claim 7, wherein said fixed plate has seats directly formed therein, and said sleeves of elastomeric material are seated into said seats of the fixed plate.

9. A valve cartridge as set forth in claim 2, wherein said elastic pressure means are helical springs provided for operating between said cartridge bottom and said fixed plate.

* * * * *